(12) United States Patent
Sahm et al.

(10) Patent No.: US 7,874,583 B2
(45) Date of Patent: Jan. 25, 2011

(54) AIRBAG ARRANGEMENT

(75) Inventors: Norbert Sahm, Aschaffenburg (DE); Claus Rudolf, Haibach (DE); Ralf Glaab, Krombach (DE); Nick Eckert, Berlin (DE); Dirk Franke, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 255 days.

(21) Appl. No.: 12/153,537

(22) Filed: May 20, 2008

(65) Prior Publication Data

US 2008/0290638 A1 Nov. 27, 2008

(30) Foreign Application Priority Data

May 22, 2007 (DE) .................. 10 2007 024 002

(51) Int. Cl.
*B60R 21/276* (2006.01)

(52) U.S. Cl. .................................. 280/739; 280/743.2

(58) Field of Classification Search .................. 280/739, 280/743.2
See application file for complete search history.

(56) References Cited

U.S. PATENT DOCUMENTS

| | | | |
|---|---|---|---|
| 5,931,497 A | 8/1999 | Fischer | |
| 6,517,108 B1 * | 2/2003 | Vinton et al. | 280/739 |
| 6,773,030 B2 | 8/2004 | Fischer | |
| 7,441,802 B2 * | 10/2008 | Yamaji et al. | 280/739 |
| 7,607,689 B2 * | 10/2009 | Kalczynski et al. | 280/739 |
| 2004/0012179 A1 | 1/2004 | Pinsenschaum et al. | |
| 2007/0040366 A1 | 2/2007 | Maidel et al. | |
| 2007/0080530 A1 | 4/2007 | Issler et al. | |

FOREIGN PATENT DOCUMENTS

| | | |
|---|---|---|
| DE | 296 09 703 U1 | 9/1996 |
| DE | 103 32 549 A1 | 3/2004 |
| DE | 10 2004 027 703 A1 | 4/2005 |
| DE | 20 2006 002 496 U1 | 8/2006 |
| DE | 10 2005 039 418 A1 | 3/2007 |
| EP | 0 670 247 B1 | 9/1995 |
| EP | 0 810 126 B1 | 12/1997 |

* cited by examiner

*Primary Examiner*—Eric Culbreth
(74) *Attorney, Agent, or Firm*—Foley & Lardner LLP

(57) ABSTRACT

An airbag arrangement for a vehicle occupant restraint system includes an inflatable airbag having at least one outflow opening through which gas can flow out of the airbag. The airbag arrangement also includes a stretchable element including a covering structure for adjustably covering a portion of the outflow opening. The covering structure moves relative to the outflow opening when the stretchable element is stretched. The airbag arrangement also includes a fastener for fastening the stretchable element to the airbag so the stretchable element stretches when the airbag inflates and the covering structure moves relative to the outflow opening changing the size of the covered portion of the outflow opening.

25 Claims, 3 Drawing Sheets

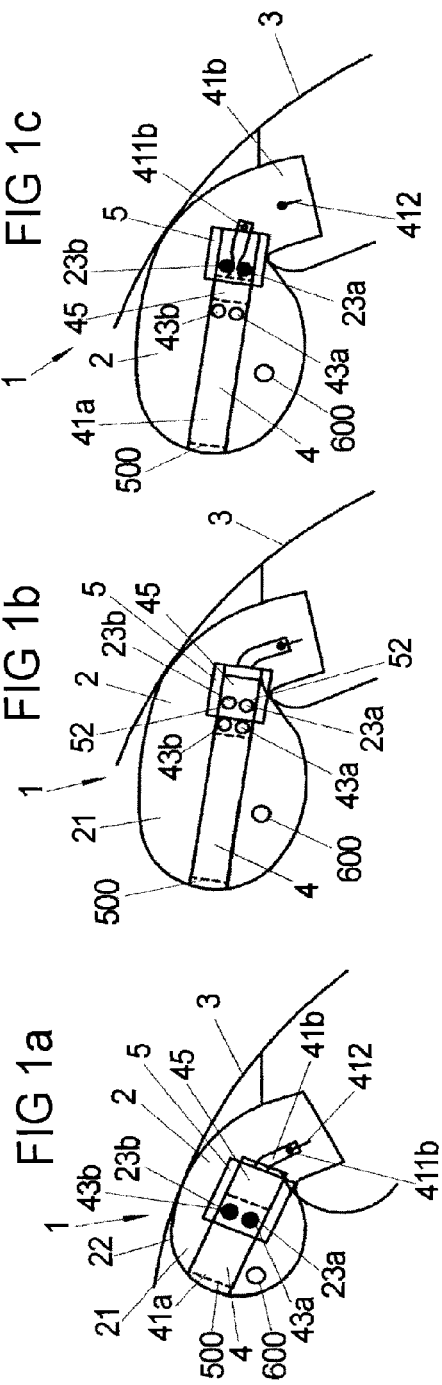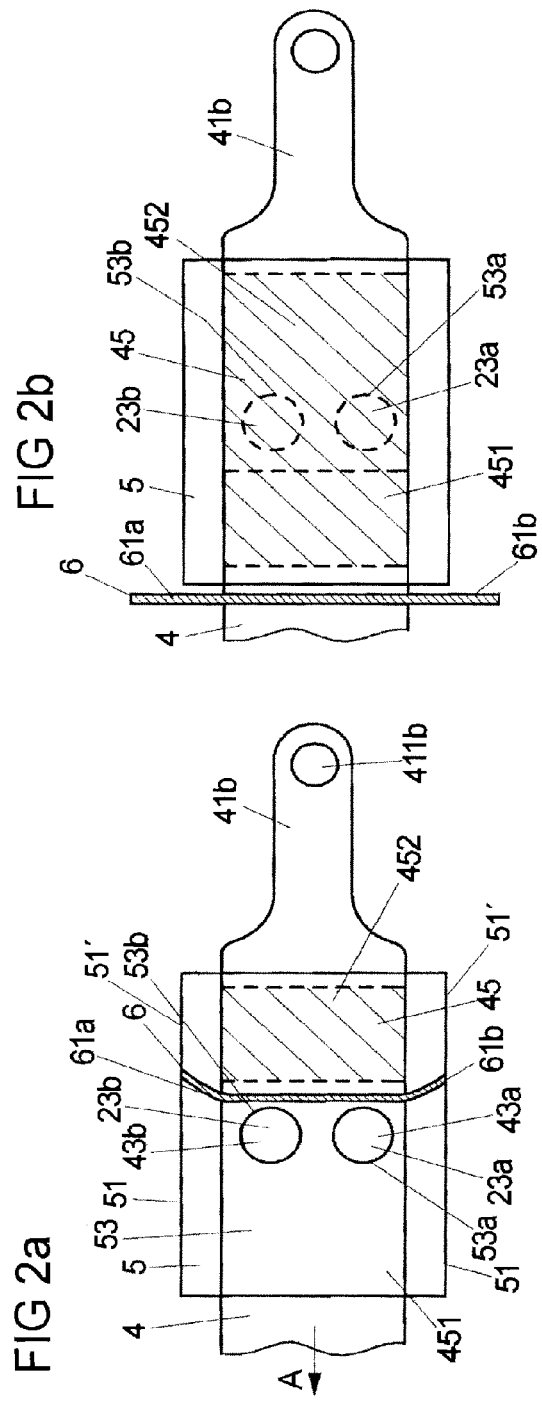

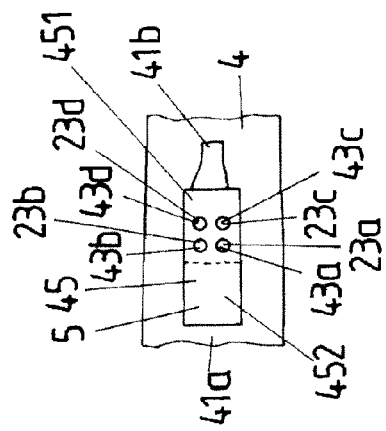
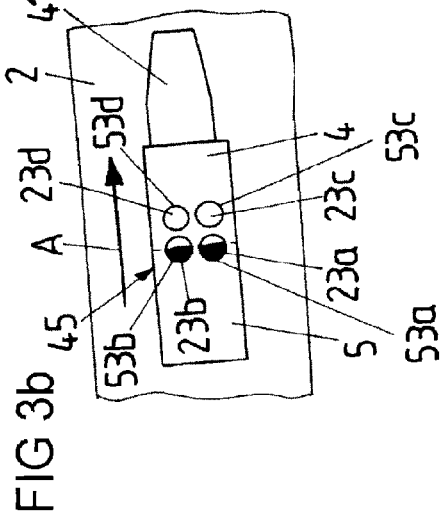
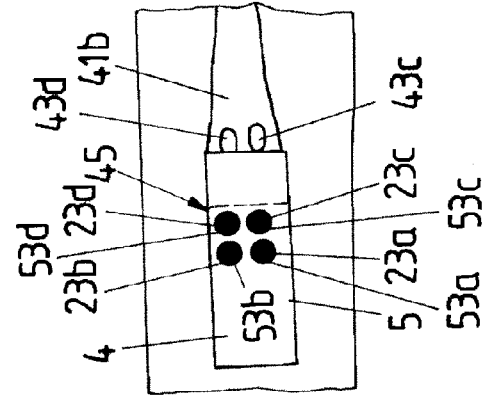
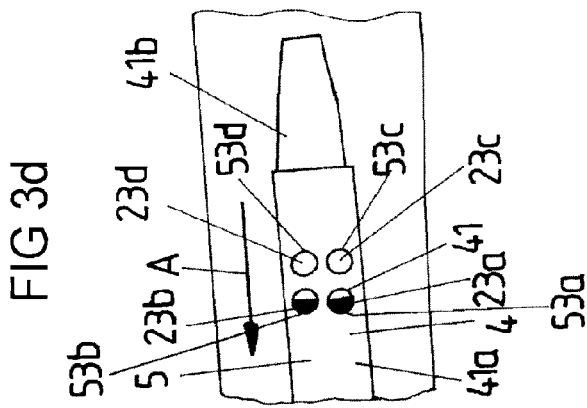

AIRBAG ARRANGEMENT

BACKGROUND

The application generally relates to an airbag arrangement for a vehicle occupant restraint system. More specifically, the application relates to an airbag arrangement including an inflatable airbag having at least one outflow opening.

Airbags of a vehicle occupant restraint system with one or more outflow openings through which gas can flow out of the partially or fully inflated airbag are known. It is possible to control the internal pressure of the airbag using the outflow opening so that the airbag can be filled as a function of characteristic variables that are relevant to the protective effect of the airbag (for example weight and size of the vehicle occupant, severity of the accident).

There is a need for an airbag having an outflow opening that is simple to produce and whose size can be changed in a flexible manner.

SUMMARY

One embodiment of the application relates to an airbag arrangement for a vehicle occupant restraint system. The airbag arrangement includes an inflatable airbag having at least one outflow opening through which gas can flow out of the airbag. The airbag arrangement also includes a stretchable element including a covering structure for adjustably covering a portion of the outflow opening. The covering structure moves relative to the outflow opening when the stretchable element is stretched. The airbag arrangement also includes a fastener for fastening the stretchable element to the airbag so the stretchable element stretches when the airbag inflates and the covering structure moves relative to the outflow opening changing the size of the covered portion of the outflow opening. The fastener is configured to release the stretchable element as a function of a control signal so the stress on the stretchable element is reduced and the covering structure moves relative to the outflow opening so the change in the size of the covered portion of the outflow opening is at least partially reversed.

BRIEF DESCRIPTION OF THE DRAWINGS

The present invention is explained in greater detail below using exemplary embodiments with reference to the figures, in which:

FIGS. 1a to 1c show an airbag arrangement according to an exemplary embodiment;

FIGS. 2a and 2b show the manufacture of the airbag arrangement according to an exemplary embodiment;

FIGS. 3a to 3d show an airbag arrangement according to another exemplary embodiment;

DETAILED DESCRIPTION

Figure 4:
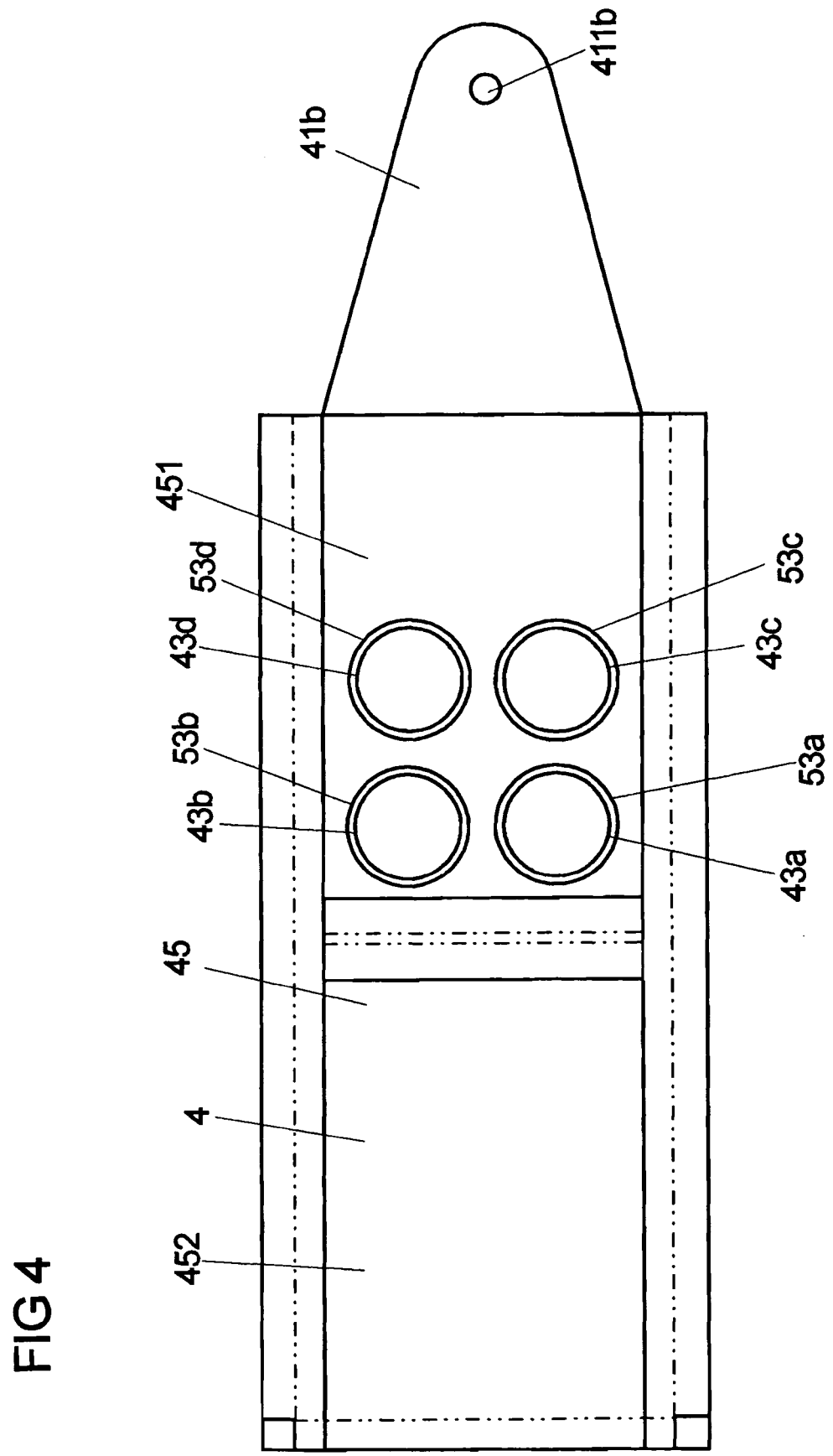
FIG. 4 is an enlarged illustration of the airbag arrangement of FIGS. 3a to 3d according to an exemplary embodiment.

According to one exemplary embodiment, an airbag may include an outflow opening as described in EP 0 670 247 A1 (incorporated by reference herein).

According to other exemplary embodiments, an airbag arrangement for a vehicle occupant restraint system includes an inflatable airbag having at least one outflow opening through which gas can flow out of the airbag. The airbag arrangement also includes a stretchable element including a covering structure for adjusting an outflow cross section of the outflow opening. The covering structure moves relative to the outflow opening when the stretchable element is stretched. The airbag arrangement also includes a fastener for fastening the stretchable element to the airbag so the stretchable element stretches when the airbag inflates and the covering structure moves relative to the outflow opening changing the outflow cross section. The fastener is configured to release the stretchable element as a function of a control signal so the stress on the stretchable element is reduced and the covering structure moves relative to the outflow opening so the change in the outflow cross section is at least partially reversed.

The airbag may include an outflow opening that can be controlled by the stretchable element. The covering structure of the stretchable element can at least partially free the outflow opening or completely cover the outflow opening when the stretchable element is in an initial state, for example when the airbag is not inflated. The effective size (the outflow cross section or the size of the covered portion of the outflow opening) of the outflow opening may reduce in size or increase in size (passive vent) when the airbag is inflated and the stretchable element is stretched.

The stretchable element may be fastened by the fastener so that the stretchable element is released in response to a control signal, increasing or reducing (active vent) the size of the outflow opening. The airbag arrangement according to various exemplary embodiments therefore exhibits a combination of a passive vent function and an active vent function.

According to another exemplary embodiment, the covering structure of the stretchable element may be moved out of an initial position when the airbag is inflated and toward the initial position again (or assume the initial position again) after the stretchable element is released. The initial position is a position of the covering structure in relation to the outflow openings of the airbag when not inflated. When the stretchable element is stretched as the airbag is inflated, the stretchable element may generate a restoring force counter to the stretching direction. The restoring force may ensure that the covering structure returns to the initial position after being released by the fastener. For example, the fastener can release a fastened portion of the stretchable element when the stretchable element is released so that the fastened portion returns in a direction counter to the stretching direction by the restoring force.

According to another exemplary embodiment, the stretchable element may be released by the fastener in such a way that the covering structure does not move away from the outflow opening in a direction counter to the stretching direction, but rather moves along the stretching direction, that is to say along the direction that the covering structure moves toward the outflow of opening when the stretchable element is stretched. Therefore, the outflow opening can be reopened by relaxing the stretchable element, causing the covering structure to return to the initial position and so that at least one portion of the stretchable element and the covering structure move out of the region of the outflow opening. According to other exemplary embodiments, the stretchable element can be completely released.

According to another exemplary embodiment, the covering structure of the stretchable element may define at least one opening that at least partially coincides with the outflow opening when the airbag is not inflated and at least partially frees the outflow opening. The geometry of the opening may have substantially the same geometry as the outflow opening. A plurality of openings can also be provided, particularly if the airbag has multiple outflow openings. For example, the openings in the covering structure may be arranged and/or formed so as to correspond to the outflow openings in the airbag.

When the airbag is inflated, the opening in the stretchable element may move relative to the outflow opening so that the region of overlap between the opening and the outflow opening in the airbag reduces in size and the size of the covered portion of the outflow opening increases. The outflow opening in the airbag may be increasingly closed by the covering structure as the airbag expands.

The opening in the stretchable element can be formed and arranged such that it assumes an initial position relative to the outflow opening in the airbag when the airbag is not inflated. The covering structure moves out of the initial position when the airbag is inflated. After the stretchable element is released by the fastener and contracts, the opening moves in the direction of the initial position so that the region of overlap between the opening and the outflow opening increases in size and the size of the covered portion of the outflow opening decreases. The stretchable element may be stretched by the airbag as it is inflated and after being released may snap back into the original state again.

According to other exemplary embodiments, the covering structure may cover the outflow opening when the airbag is not inflated and the outflow opening may be at least partially freed or opened only when the airbag is inflated. The covering structure moves away from the outflow when the stretchable element is stretched so that the covered portion of the outflow opening decreases in size. The covering structure can have at least one opening in this exemplary embodiment. When the stretchable element stretches, the opening is moved in the direction of the outflow opening in the airbag so that the two openings coincide and gas can flow out of the airbag through the openings.

According to another exemplary embodiment, the stretchable element may be an elastic band that is fastened at opposite ends in the uninflated airbag. The band can run, for example, inside the airbag or on an outer face of the airbag with at least one of the ends being fastened (e.g., securely stitched) to the inner face or to the outer face of the airbag. According to another exemplary embodiment, one end of the band may be fastened to the airbag while the opposite end is fastened to a modular housing surrounding the airbag.

The stretchable element may not to be completely elastic, but can have an elastic structure. The elastic structure may be, for example, a spring, an elastic material, or an elastic band. According to some exemplary embodiments, the covering structure may be substantially incapable of stretching and may be connected to the elastic structure.

According to another exemplary embodiment, the stretchable element may pass through a receptacle (e.g., a pocket-like receptacle) that is connected to the airbag so that the covering structure of the stretchable element moves substantially along the stretching direction of the stretchable element when the airbag is inflated. The receptacle can have openings so that gas can escape to the outside through the outflow opening in the airbag, through the opening in the covering structure, and through the opening in the receptacle.

According to another exemplary embodiment, the stretchable element may include a blocking element that counteracts movement of the covering structure in a direction counter to the direction the covering structure has been moved (counter to the stretching direction) by the stretchable element when the airbag is inflated. The covering structure may only move substantially in the stretching direction (across the outflow opening in the airbag) when the stretchable element is released by the fastener.

According to another exemplary embodiment, the airbag can additionally have at least one further outflow opening whose covering portion cannot be adjusted by the stretchable element. For example, the further outflow opening may be permanently open during inflation of the airbag. Gas flows out of the airbag by both the outflow opening, which can be controlled by the stretchable element, and at least one permanently open further outflow opening.

FIGS. 1a to 1c relate to an exemplary embodiment of the airbag arrangement. FIG. 1a shows an airbag arrangement 1 including an inflatable airbag 2 in a module housing 3. The airbag 2 has an inflatable chamber 21 that is enclosed by an airbag material 22. The airbag material 22 contains two circular outflow openings 23a, 23b that are arranged next to one another. Gas that has flowed into the chamber 21 can at least partially flow out of the outflow openings.

A stretchable element or an elastic band 4 runs on the outer face of the airbag 2 (on a side of the airbag material 22 averted from the chamber 21) to adjust the size of the covered portion of the outflow openings 23a, 23b. The elastic band 4 is guided in a pocket-like receptacle 5 and has opposite ends 41a, 41b. One of the ends (41a) is fastened to the outer face of the airbag by a fastener (e.g., a seam 500). The other end 41b extends (e.g., in a lug-like manner) from the remainder of the elastic band 4 and has an opening 411b into which a pin-like element 412 of the fastener engages and fastens the end 41b.

The elastic band 4 includes a covering region 45 to adjust the size of the respective covered portions of the outflow openings 23a, 23b and limit the gas stream flowing out of the airbag. The covering region 45 has two openings 43a, 43b whose geometry and distance in relation to one another are similar to that of the outflow openings 23a, 23b in the airbag 2. FIG. 1a shows the airbag as not inflated and the openings 43a, 43b in the elastic band 4 substantially coincide with the outflow openings 23a, 23b in the airbag 2. The pocket 5 can also have openings that correspond, for example, to the outflow openings 23a, 23b.

The elastic band 4 is fastened by the fastener in such a way that it stretches when the airbag 2 or the inflatable chamber 21 is inflated. When the airbag 2 or the inflatable chamber 21 are inflated, the openings 43a, 43b in the band 4 are moved away from the outflow openings 23a, 23b and the region of overlap between the openings 43a, 43b and the outflow openings to 23a, 23b reduces in size. Given a certain degree of expansion of the airbag 2, the elastic band 4 is stretched in such a way that the two openings 23a, 23b no longer coincide with the outflow openings 43a, 43b at all, but are completely covered by the covering structure 45, so that no gas can flow out of the chamber 21 through the outflow opening 23a, 23b as illustrated in FIG. 1b.

The degree of expansion of the airbag (the filling quantity) at which the outflow openings 23a, 23b are closed depends on the design of the band 4 and its arrangement in the airbag. Because the outflow openings 23a, 23b close only at a certain filling level of the airbag, advantageously, the outflow openings 23a, 23b may remain open in an OOP situation (out-of-position situation) of a vehicle occupant in which the airbag cannot be deployed in the intended manner because the occupant is not in (the customary) position and excessive inflation of the airbag is avoided. After a certain time during inflation of the airbag the OOP situation may no longer be present and the airbag can deploy correctly. As a result, the elastic band 4 is stretched so that the outflow openings 23a, 23b are closed and the airbag is filled with a higher pressure.

If during or after deployment of the airbag a control system of the vehicle occupant restraint system detects that a lower pressure is required in the airbag, the control system generates a control signal and transmits the control signal to the fastener. The fastener releases the end 41b of the elastic band 4 that is fastened to the airbag module 3 by moving the fastening pin 412 out of the fastening opening 411b as illustrated in FIG. 1c.

When the end 41b is released, the band 4 contracts and the end 41b is moved in the direction of the opposite end 41a so that the openings 43a, 43b are further away from the outflow openings 43a, 43b. In other words, the covering structure 45, which contains both openings 43a, 43b, moves approximately in the same direction as when the airbag is inflated and the elastic band 4 is stretched. The lug-like shape of the end 41b allows the end 41b to not cover or only slightly cover the outflow openings 23a, 23b after being released. The length of the elastic band (in the unstretched state) may be such that the band is no longer in the region of the outflow openings 23a, 23b at all after the end 41b is released.

According to alternative exemplary embodiments, more than two outflow openings can be provided. In another example, the band 4 may have only one (for example continuous) covering structure that is connected to narrow (e.g., thread-like) ends instead of openings. The ends may be positioned next to the outflow openings 23a, 23b when the airbag is not inflated. The end to be released may run between the outflow openings 23a, 23b and be narrow enough to not coincide or to coincide slightly with the outflow openings.

FIGS. 2a and 2b illustrate exemplary embodiments of the airbag arrangement of FIGS. 1a to 1c. The elastic band 4 has the covering region 45 with mutually adjacent openings 43a, 43b that completely free or open outflow openings 23a, 23b in the airbag when not inflated, as shown in FIG. 2a. The band 4 is guided in the pocket-like receptacle 5 which is mounted on an outer face of the airbag and of which portions extend along the band. The band 4 may be formed from a textile fabric, for example. The receptacle 5 has opposing side edges 51 that are connected to the airbag 2 so that the airbag 2 and a portion 52 of the receptacle 5 extending between the edges 51 form an opening through which the band 4 extends. The receptacle 5 has openings 53a, 53b that are aligned with the outflow openings 23a, 23b in the airbag so gas can flow out of the airbag more easily. The openings 53a, 53b do not need to be aligned with the outflow openings 23a, 23b, but can be arranged offset in relation to the outflow openings.

The band 4 includes a blocking element or a rod-like element 6 in the region of the covering structure 45. The rod-like element 6 includes opposing ends 61a, 61b that bend and rest against an inner edge 51' of the receptacle 5. If the airbag is deployed, the band 4 is stretched as in FIG. 1b and the openings 43a, 43b move away from the outflow openings 23a, 23b so that the covering structure 45 completely covers the outflow openings 23a, 23b by way of a continuous portion 451 as illustrated in FIG. 2b.

When the airbag inflates, the elastic band 4 is stretched (in the direction of arrow A) to the extent that the rod-like element 6 is drawn out of the pocket 5 and ends 61a, 61b bend upward and protrude beyond the receptacle 5. As a result, movement of the covering structure and the openings 43a, 43b in a direction counter to the stretching direction A is prevented.

As shown in FIGS. 1a, 1b, and 1c, the airbag can additionally have at least one further outflow opening whose covering portion cannot be adjusted by the stretchable element. For example, the further outflow opening schematically shown at 600 may be permanently open during inflation of the airbag. Gas flows out of the airbag by both the outflow opening, which can be controlled by the stretchable element, and at least one permanently open further outflow opening.

FIGS. 3a to 3d illustrate a further exemplary embodiment of the airbag arrangement. FIG. 3a shows detail of the airbag 2, which has four circular outflow openings 23a to 23d that are arranged in a generally square pattern. The stretchable element or elastic band 4 extends in a region of the outflow openings 23a to 23d and includes a covering structure 45 that has circular openings 43a to 43d that are each associated with one of the outflow openings 23a to 23d and completely coincide with the outflow openings in an initial position (as shown in FIG. 3a). The covering structure 45 completely frees or opens the outflow openings 23a to 23d in the airbag 2 in the initial position.

The band 4 is fastened to the airbag (for example to an inner wall or an outer wall of the airbag) at both of ends 41a, 41b by a fastener so that the band stretches along a direction A when the airbag 2 is inflated, as shown in FIG. 3b. As band 4 is stretched the openings 43a to 43d move away from the outflow openings 23a to 23d along the stretching direction A. The region of overlap between the openings 43a to 43b and the outflow openings 23a to 23d is reduced and disappears because a portion 452 of the covering structure 45 completely closes the outflow openings 23a to 23d as illustrated in FIG. 3c.

FIG. 3d shows how the fastener releases an end 41b of the band 4 in response to a control signal while the opposite end 41a remains fastened to the airbag. As a result, the elastic band 4 contracts in a direction counter to the stretching direction A (arrow B) and the openings 43a to 43d move toward the outflow openings 23a to 23d until the openings fully coincide with the outflow openings and gas can flow out of the airbag.

The band 4 is guided in the pocket 5 so that the band 4 is stretched mainly along its direction of longitudinal extent and cannot be moved transversely to or away from the airbag. The pocket 5 has openings 53a to 53d that have substantially the same geometry and distance in relation to one another as the outflow openings 23a to 23d in the airbag 2 so that if the covering structure 45 frees the outflow openings 23a to 23d, gas can flow out of the airbag through the openings 53a to 53d in the pocket 5 and to the outside.

FIG. 4 shows an enlarged illustration of the band 4 from FIGS. 3a to 3d according to an exemplary embodiment. In a first section 451, the covering structure 45 of the band 4 has openings 43a to 43d that may coincide with outflow openings in an airbag in an initial position of the elastic band 4 (in the uninflated airbag) as compared to the exemplary embodiment in FIG. 3a. A continuous second portion 452 of the covering structure 45 is connected to the first portion 451 and may be a continuous elastic material, for example an elastic fabric.

The band 4 includes a lug-like and outwardly tapering end 41b that can be fastened to a modular housing (or, for example, to a pyrotechnic unit of an airbag module) such that a tensile force is exerted on the band 4 by the end 41b when the airbag is inflated. The end 41b includes a fastening opening 411b to aid in fastening.

When the airbag is inflated, at least the elastic portion 452 of the covering structure 45 is stretched. The portion 451 in which the openings 43a to 43d are arranged does not need to be formed from an elastic material, but the portion 451 can be integrally formed with the portion 452 from a common elastic material.

Germany Priority Application 10 2007 024 002.5, filed May 22, 2007 including the specification, drawings, claims and abstract, is incorporated herein by reference in its entirety.

Given the disclosure of the application, one versed in the art would appreciate that there may be other embodiments and modifications within the scope and spirit of the application. Accordingly, all modifications attainable by one versed in the art from the present disclosure within the scope and spirit of the present application are to be included as further embodiments of the present application. The scope of the present application is to be defined as set forth in the following claims.

What is claimed is:

1. An airbag arrangement for a vehicle occupant restraint system, comprising:
   an inflatable airbag comprising at least one outflow opening through which gas can flow out of the airbag;
   a stretchable element comprising a covering structure for adjustably covering a portion of the outflow opening, the covering structure being moved relative to the outflow opening when the stretchable element is stretched;
   a fastener for fastening the stretchable element to the airbag so the stretchable element stretches when the airbag inflates and the covering structure moves relative to the outflow opening changing the size of the covered portion of the outflow opening; and
   a receptacle connected to the airbag,
   wherein at least portions of the stretchable element pass through the receptacle,
   wherein the fastener is configured to release the stretchable element as a function of a control signal so the stress on the stretchable element is reduced and the covering structure moves relative to the outflow opening so the change in the size of the covered portion of the outflow opening is at least partially reversed.

2. The airbag arrangement as claimed in claim 1, wherein the covering structure of the stretchable element at least partially frees the outflow opening when the airbag is not inflated.

3. The airbag arrangement as claimed in claim 2, wherein the stretchable element is configured such that the covering structure moves over the outflow opening and increases the size of the covered portion of the outflow opening when the airbag is inflated.

4. The airbag arrangement as claimed in claim 3, wherein the covering structure moves away from the outflow opening after the stretchable element is released by the fastener so that the covered portion of the outflow opening decreases in size.

5. The airbag arrangement as claimed in claim 1, wherein the covering structure moves in a direction toward the outflow opening when the stretchable element is stretched and the fastener releases the stretchable element so the covering structure moves away from the outflow opening substantially counter to the direction.

6. The airbag arrangement as claimed in claim 1, wherein the covering structure moves in a direction toward the outflow opening when the stretchable element is stretched and the fastener releases the stretchable element so the covering structure moves away from the outflow opening substantially along the direction.

7. The airbag arrangement as claimed in claim 1, wherein the covering structure comprises at least one opening that at least partially coincides with the outflow opening when the airbag is not inflated.

8. The airbag arrangement as claimed in claim 7, wherein the at least one opening is of substantially the same geometry as the outflow opening.

9. The airbag arrangement as claimed in claim 8, wherein the at least one opening moves relative to the outflow opening so the region of overlap between the at least one opening and the outflow opening is reduced in size and the size of the covered portion of the outflow opening is reduced when the airbag is inflated.

10. The airbag arrangement as claimed in claim 7, wherein the at least one opening is at an initial position relative to the outflow opening when the airbag is not inflated, and wherein the at least one opening moves out of the initial position when the airbag is inflated and returns toward the initial position to such an extent that a region of overlap between the at least one opening and the outflow opening increases in size and the size of the covered portion of the outflow opening decreases after the stretchable element is released by the fastener.

11. The airbag arrangement as claimed in claim 1, wherein the covering structure covers the outflow opening of the airbag when the airbag is not inflated.

12. The airbag arrangement as claimed in claim 11, wherein the stretchable element is configured such that the covering structure moves away from the outflow opening when the airbag is inflated and the covered portion of the outflow opening increases in size.

13. The airbag arrangement as claimed in claim 12, wherein the stretchable element moves toward the outflow opening after being released by the fastener and the covered portion of the outflow opening is decreased in size.

14. The airbag arrangement as claimed in claim 1, wherein the stretchable element has an elastic structure or is formed from an elastic material.

15. The airbag arrangement as claimed in claim 14, wherein the elastic structure is a spring, an elastic material, or an elastic band.

16. The airbag arrangement as claimed in claim 14, wherein the covering structure cannot be substantially stretched and is connected to the elastic structure.

17. The airbag arrangement as claimed in claim 1, wherein the covering structure is stretchable and integrally formed with the stretchable element.

18. The airbag arrangement as claimed in claim 17, wherein the stretchable element is an elastic band that is fastened at opposite ends in the airbag.

19. The airbag arrangement as claimed in claim 18, wherein the fastener releases at least one of the ends as a function of a control signal.

20. The airbag arrangement as claimed in claim 1, wherein the covering structure is fastened to the airbag, to an airbag module surrounding the airbag, or to a combination thereof.

21. The airbag arrangement as claimed in claim 1, wherein the stretchable element comprises a blocking element that interacts with the receptacle to counteract a movement of the covering structure in a direction counter to which the covering structure moves relative to the outflow opening by the stretchable element when the airbag is inflated.

22. The airbag arrangement as claimed in claim 1, wherein the airbag comprises at least one further outflow opening with a covered portion that cannot be adjusted by the stretchable element.

23. The airbag arrangement as claimed in claim 22, wherein the further outflow opening is permanently open during inflation of the airbag.

24. A vehicle occupant restraint system comprising an airbag arrangement as claimed in claim 1.

25. An airbag arrangement for a vehicle occupant restraint system, comprising:
   an inflatable airbag comprising at least one outflow opening through which gas can flow out of the airbag;
   a stretchable element comprising a covering structure for adjustably covering a portion of the outflow opening, the covering structure being moved relative to the outflow opening when the stretchable element is stretched; and
   a fastener for fastening the stretchable element to the airbag so the stretchable element stretches when the airbag inflates and the covering structure moves relative to the outflow opening changing the size of the covered portion of the outflow opening, wherein the fastener is configured to release the stretchable element as a function of a control signal so the stress on the stretchable element is reduced and the covering structure moves relative to the outflow opening so the change in the size of the covered portion of the outflow opening is at least partially reversed, wherein the stretchable element is moved out of an initial position when the airbag is inflated and toward the initial position again after the stretchable element is released.

* * * * *